United States Patent [19]

Hung

[11] Patent Number: 5,915,742
[45] Date of Patent: Jun. 29, 1999

[54] CAR DOOR SEPARATING AND ATTACHING DEVICE

[76] Inventor: Wen-Cheng Hung, No. 392, Lin Sen Western Road, Chia I City, Taiwan

[21] Appl. No.: 08/950,067

[22] Filed: Oct. 14, 1997

[51] Int. Cl.⁶ .................................................. B25B 27/14
[52] U.S. Cl. ........................................... 29/281.5; 269/17
[58] Field of Search .................................... 254/2 R, 2 B, 254/134; 29/281.5; 269/17, 296, 299, 71, 79, 69, 76

[56] References Cited

U.S. PATENT DOCUMENTS

| | | | |
|---|---|---|---|
| 4,029,308 | 6/1977 | Mathers | 269/17 |
| 4,183,511 | 1/1980 | Marek | 269/17 |
| 5,294,098 | 3/1994 | Bundy | 254/134 |
| 5,707,450 | 1/1998 | Thompson | 269/17 |

*Primary Examiner*—David A. Scherbel
*Assistant Examiner*—Daniel G. Shanley
*Attorney, Agent, or Firm*—Rosenberg, Klein & Bilker

[57] ABSTRACT

A car door separating and attaching device includes a base, a jack mounted on the base, an angle adjusting base and a clamp frame mounted on the jack. The angle adjusting base adjusts the angle of the clamp frame to suit to the door of a car, and the jack lifts them to a height needed. Then the distance between two clamp rods of the clamp frame and then the distance between the two clamp rods and a lateral tube are adjusted according to the size of the door of a car to be separated or attached. Thus the door or tailgate of a car is securely clamped by the device, permitting only one worker perform separating or attaching work with easiness and convenience.

7 Claims, 7 Drawing Sheets

CAR DOOR SEPARATING AND ATTACHING DEVICE

BACKGROUND OF THE INVENTION

This invention relates to a car door separating and attaching device, particularly to one possible to let only one worker perform separating and attaching work by supporting clamping the door or tailgate of a car or a station wagon, etc.

Nowadays cars are widely used, and so many of them are on highways, roads, streets, etc. Consequently, car accidents are growing frequent, so chances are that side doors or tailgates of station wagons may be damaged.

In repairing side doors or tailgates, they often have to be separated from cars, and in separating them from cars, one worker has to support the damaged door, and another worker disengages screws from a car. After repair, to attach the door on the car, again one worker has to support the door and another worker attaches it on the car. If the door is quite large and heavy, then more than one worker have to take part in repairing work, very inconvenient.

SUMMARY OF THE INVENTION

The main purpose of the invention is to offer a special device for separating and attaching the door or tailgate of a car or station wagon, etc. so that one worker can separate and attach a car door.

One feature of the invention is a jack mounted on a base for lifting an angle adjusting base and a clamp frame to a needed height for supporting and clamping the door or tailgate of a car.

Another feature of the invention is the angle adjusting base for adjusting the angle of the clamp frame to suit to the size of the door of a car.

Another feature of the invention is the clamp frame for clamping the door securely for a worker to perform separating and attaching work of a car door.

BRIEF DESCRIPTION OF DRAWINGS

This invention will be better understood by referring to the accompanying drawings, wherein.

DETAILED DESCRIPTION OF THE PREFERRED EMBODIMENTS

Figure 1:
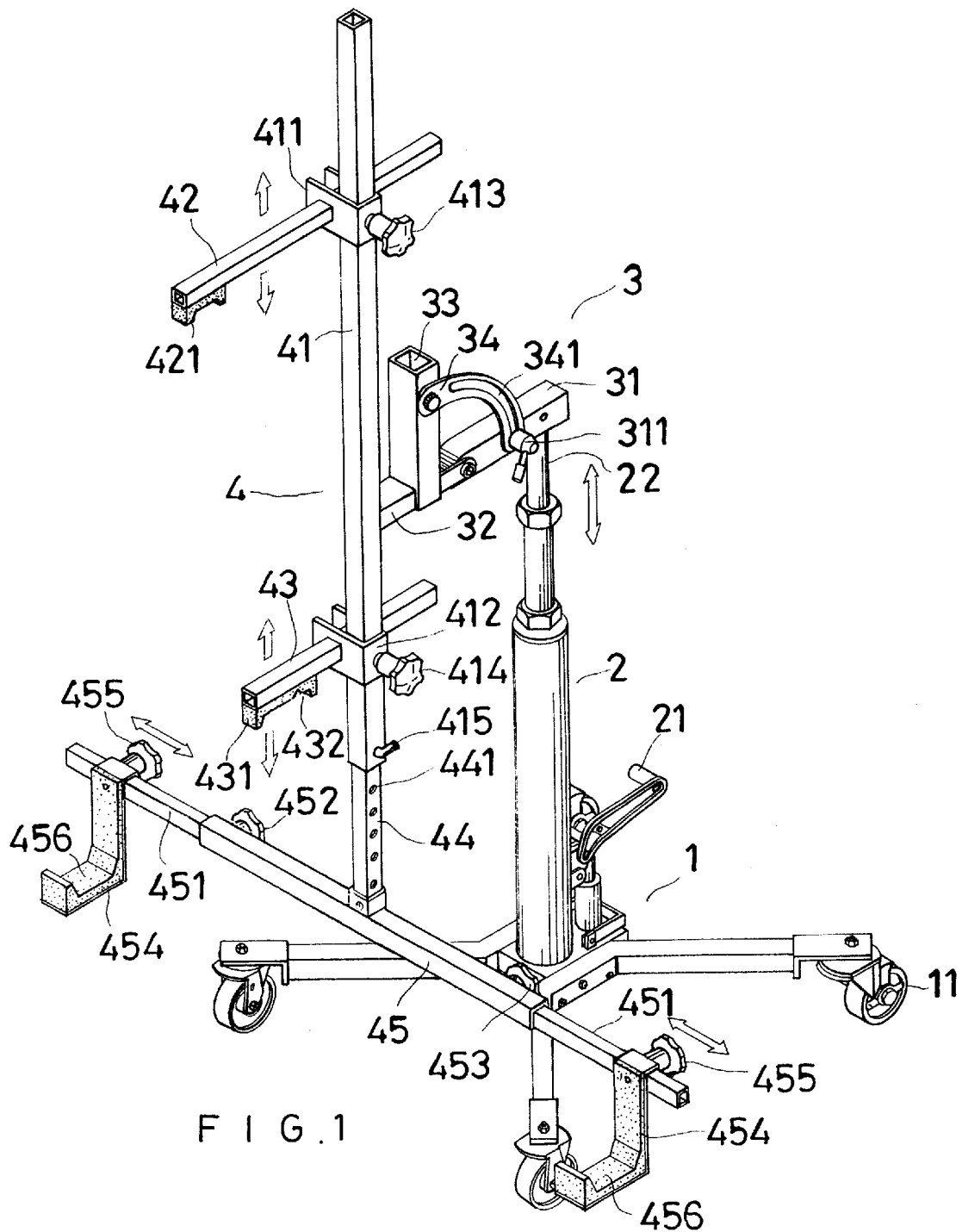
FIG. 1 is a perspective view of a first preferred embodiment of a car door separating and attaching device in the present invention.

A first preferred embodiment of a car door separating and attaching device in the present invention, as shown in FIG. 1, includes a base 1 with casters 11, a jack 2 mounted on the base 1, a pump pedal 21 attached to the jack 2 for pushing up an output shaft 22 of the jack 2 (a well-known art, not to be described here), an angle adjusting base 3 and a clamp frame 4 combined on top of the output shaft 22.

The angle adjusting base 3 includes a fix base 31, a connect rod 32, a fix arm 33 and a curved guide member 34.

The fix base 31 has one end fixed on top of the output shaft 22 of the jack 2, and the other end pivotally connected with the connect rod 32, a tightening grip 311 threadably fixed on a side of the fix base 31. The connect rod 32 has one end connected fixedly with the clamp base 4, and the fix arm 33 is fixed vertically on the connect rod 32. The fix arm 33 has a vertical side connected with the curved guide member 34 having a guide slot 341. The tightening grip 311 fits in lower end of the guide slot 341.

The clamp frame 4 consists of a sleeve 41, two clamp rods 42, 43, an extension tube 44 and a lateral tube 45.

The sleeve 41 is connected fixedly with an inner end of the connect rod 32 at an intermediate portion, and two position bases 411, 412 are respectively fitted movably around an upper portion and a lower portion of the sleeve 41. Two horizontal clamp rods 42, 43 are respectively fixed with and protrude through the two position bases 411, 412, and two soft rubber cushions are respectively fastened under one end of the position bases 411, 412 so as to protect the paint of a door to be separated from damaged. In addition, the soft rubber cushions 421, 431 have a V-shaped notch 432 to securely fit with the edge of the glass of a door. The position bases 411, 412 each have a large head bolt 413, 414 threadably connected with them for permitting the position bases 411, 412 move up and down along the sleeve 4 to suit to different size of a door to be separated or attached. At the same time, the clamp rods 42, 43 can also be loosened and tightened by the large head bolts 413, 414 for adjusting the length protruding out of the position bases 411, 412.

The sleeve 41 further has a pin 415 fitting through a lower end of the sleeve 41, fitting in one of many pin holes 441 provided vertically spaced apart in a same side of the extension tube 44 extending in the sleeve 41 from the lower end so that the height of the sleeve 41 may be adjusted by means of the pin 415. In addition, the extension tube 44 has its lower end connected with a lateral tube 45, which has two ends, in which two auxiliary rods 451, 451 extend movably and can be tightened by means of large-head bolts 452, 453 at any of many extended positions relative to the lateral tube 45. Further, an L-shaped position plate 454 is respectively fitted movably on each extension rod 451 and can be tightened at any of many locations thereon by means of a large-head bolt 455. The plate 454 further has a soft rubber cushion 456 to prevent the paint of a door from damaged.

Figure 2:
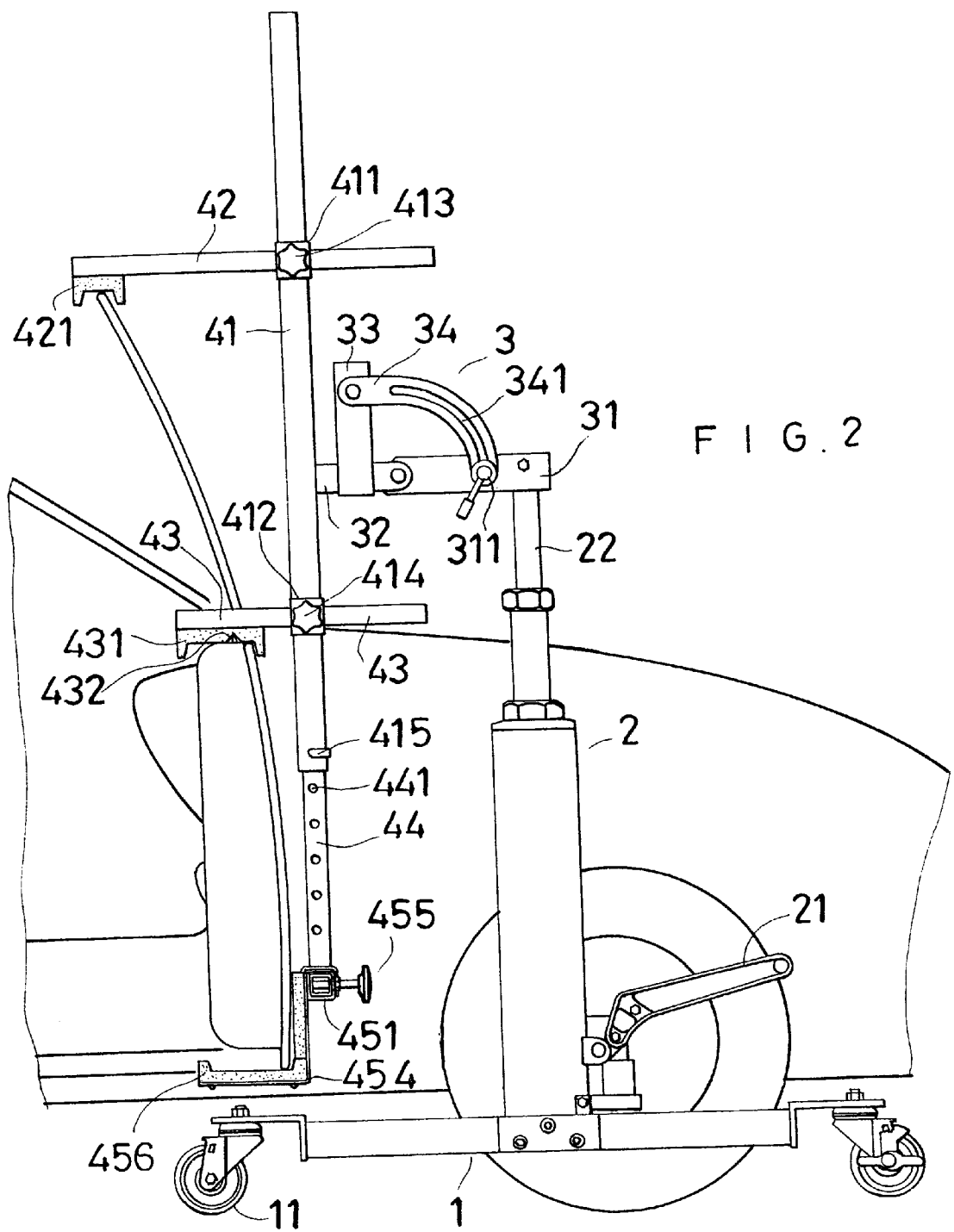
FIG. 2 is a side view of the first preferred embodiment of the car door separating and attaching device in the present invention, showing it in separating a side door of a car.

In using this invention, referring to FIG. 2, firstly, the angle adjusting base 3 and the clamp 4 are lifted to a proper height according to the size of a door to be separated by operating the jack 2. Next, the distance between the clamp rods 42, 43 and between the lateral tube 45 and the auxiliary rods 451, 451 are adjusted as needed by handling the large-head bolts 413, 414 and the pin 415 fitting in a proper pin hole 441 of the extension tube 44 so that the clamp rods 42, 43 may clamp the glass edges of a door. Then the auxiliary rods 451, 451 are adjusted in the distance of extending out of the lateral tube 45 by handling the large-head bolts 452, 453 so that the position plates 454, 454 may securely hold the lower end of the door, with the whole door clamped by the clamp frame 4. Then the door can be separated from the car with one worker only.

Figure 3:
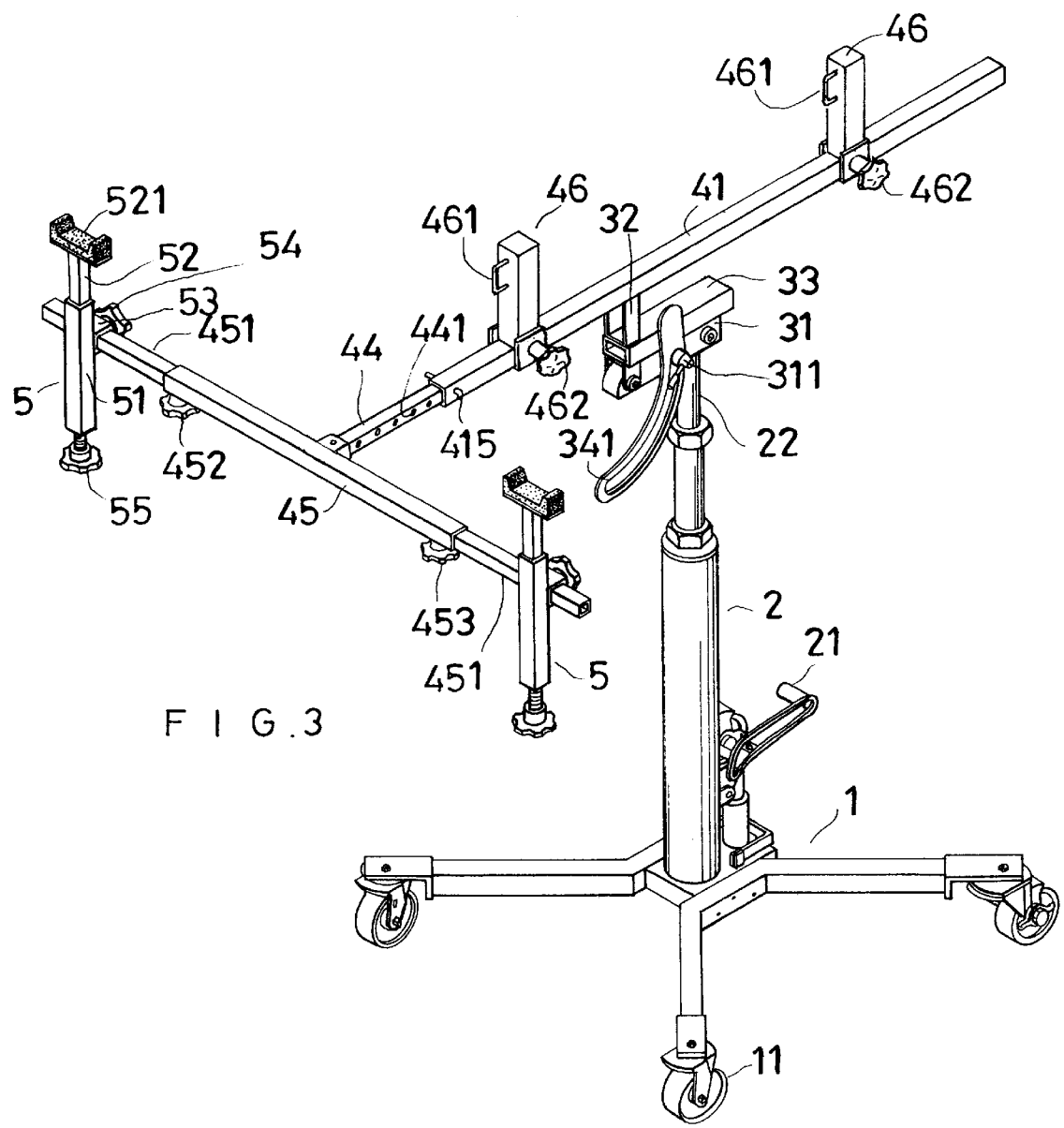
FIG. 3 is a perspective view of a second preferred embodiment of a door separating and attaching device in the present invention.
Figure 4:
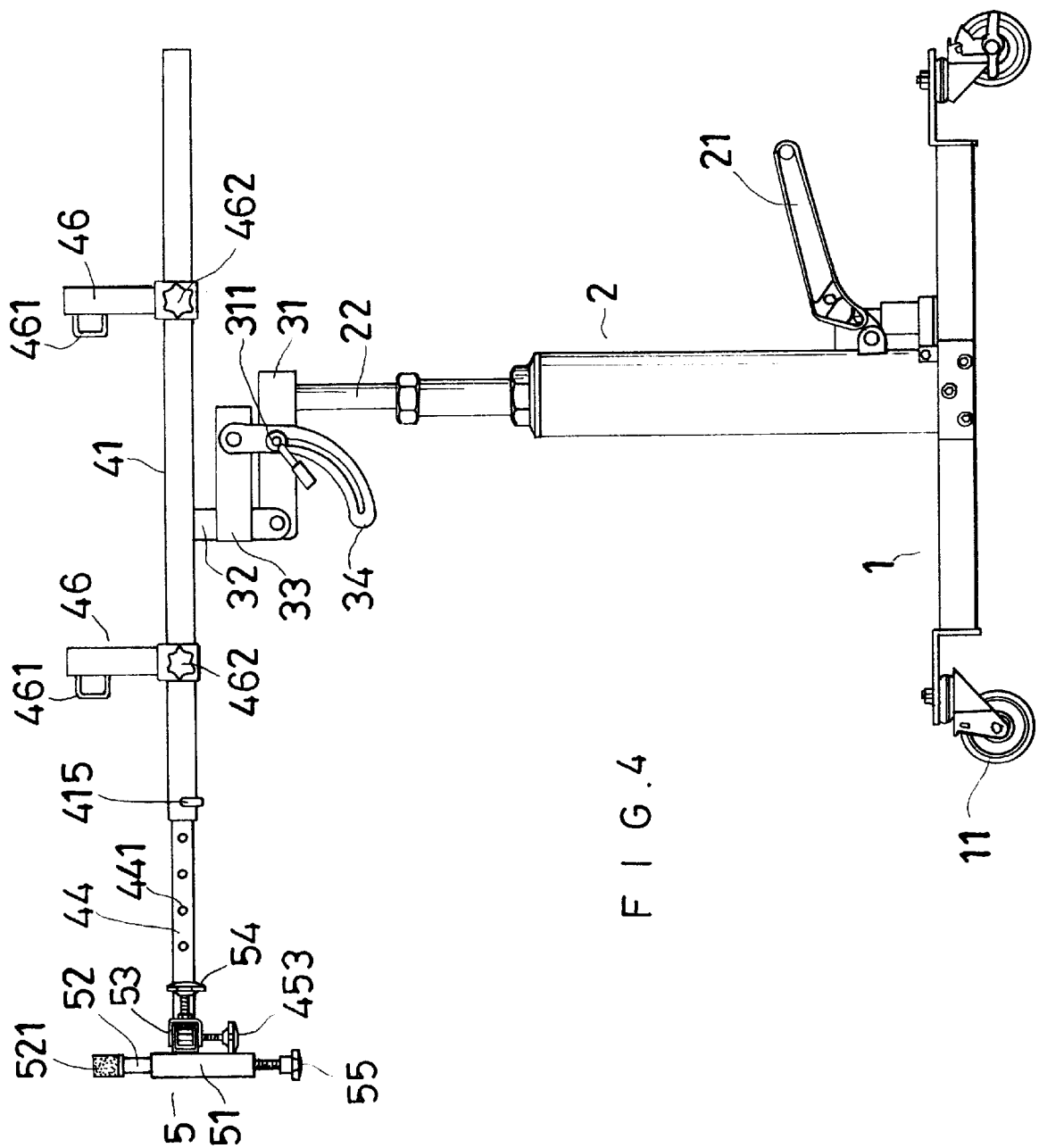
FIG. 4 is a right side view of the second preferred embodiment of a car door separating and attaching device in the present invention.

A second preferred embodiment of a car door separating and attaching device is shown in FIGS. 3 and 4, having almost the same structure as the first preferred embodiment, except two clamp hook rods 46, 46 used instead of the two clamp rods 42, 43 in the first embodiment.

The clamp hook rods 46, 46 are combined movably on the sleeve 41 and tightened at one of many locations thereon by means of large-head bolts 462, having a hook 461.

In addition, the L-shaped position plates 454, 454 disposed on the auxiliary rods 451, 451 in the first embodiment are displaced with support rods 5, 5, which respectively have an outer tube 51, an inner tube 52 fitting movably in the outer tube 51, and a position base 53 sidewise provided and fitting around each auxiliary rods 451 and tightened by a large-head bolt 54 at one of many locations thereon. Further, an adjusting screw 55 fits threadably in the outer tube 51 from a lower end and fixed with a lower end of the inner tube 52, which has a soft rubber cushion 521 fastened on its top. Then the inner tube 52 can be lifted up to a needed height by the screw 55.

Figure 5:
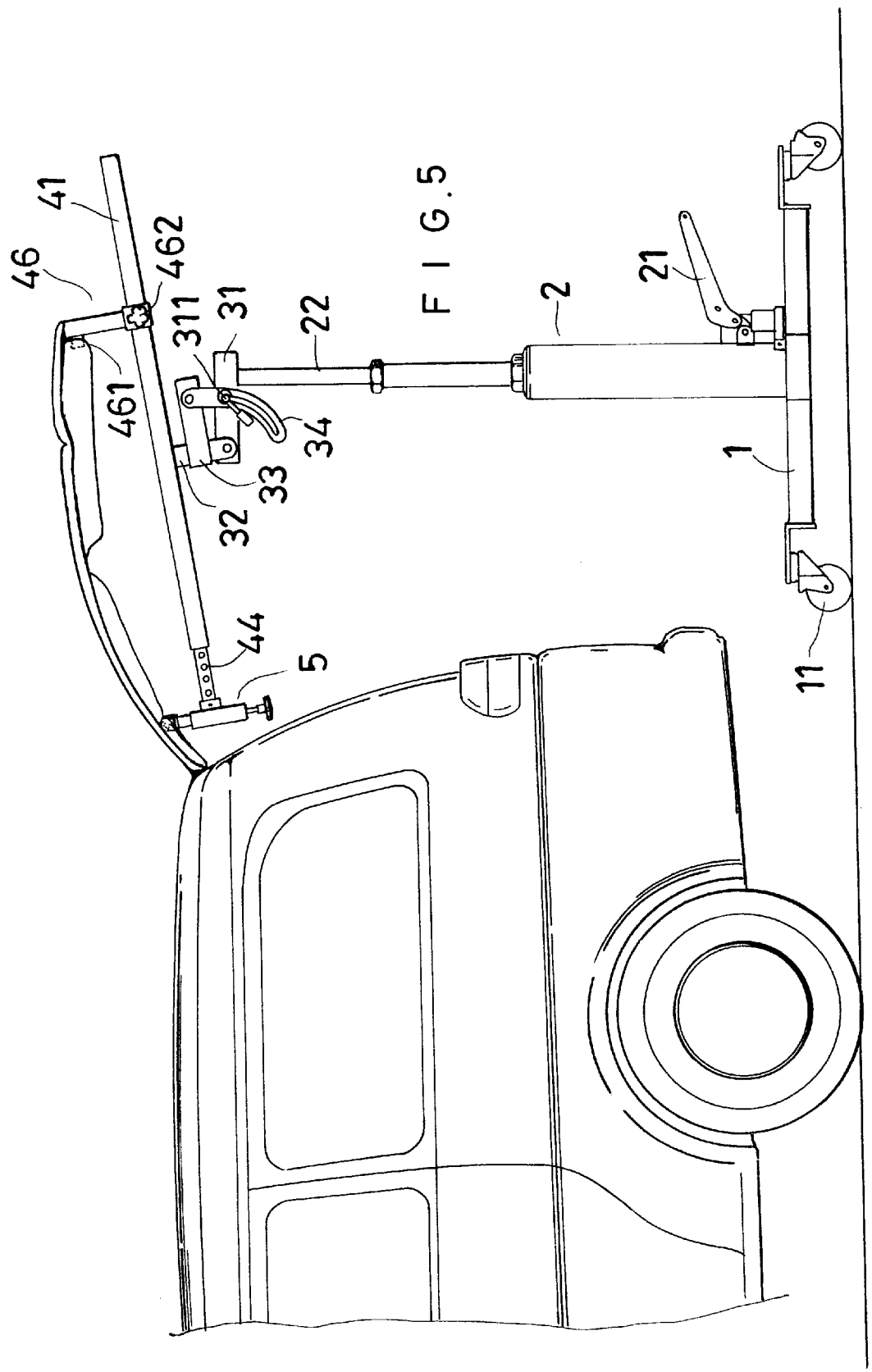
FIG. 5 is a side view of the second preferred embodiment of a car door separating and attaching device in the present invention, showing it in separating a rear swingable tailgate of a station wagon.

If the tailgate of a station wagon is needed to be separated from the wagon, referring to FIG. 5, the tightening grip 311 of the position base 31 of the angle adjusting base 3 is loosened. Then the fix arm 33 is moved to move the connect rod 32, swinging the clamp frame 4 to incline upward to a needed position, with the tightening grip 311 again tightened. Next, the clamp frame 4 is raised up to a proper height, with the hooks 461, 461 of the clamp hook rods 46, 46 booking latches of the tailgate. Then the distance between the clamp hook rods 46, 46 and the support rods 5, 5 is adjusted, and the inner tubes 52, 52 of the support rods 5, 5 is lifted up to surely support the tailgate. Then the tailgate may be separated from the wagon.

Figure 6:
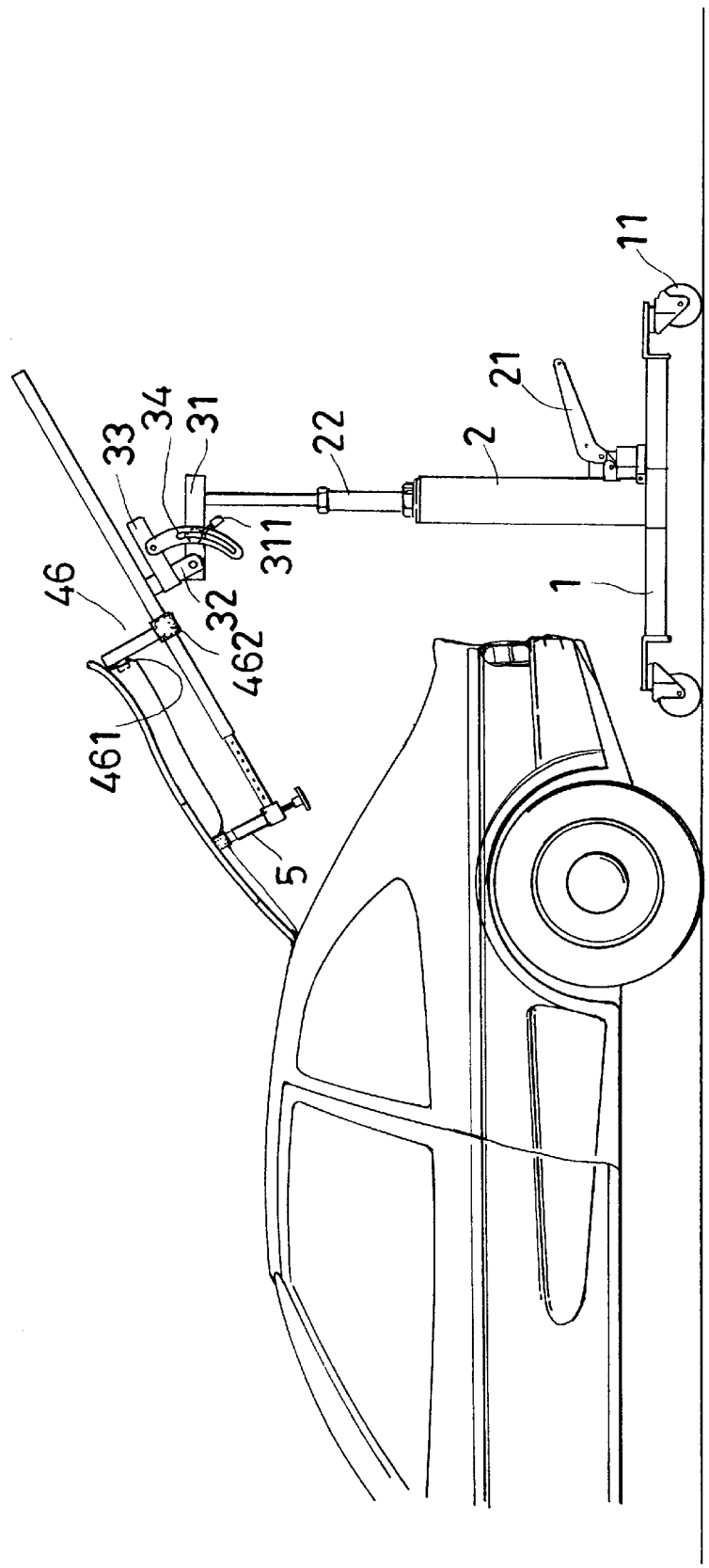
FIG. 6 is a side view of the second preferred embodiment of a car door separating and attaching device in the present invention, showing it in separating a tailgate of a station wagon; and, FIG. 7 is a perspective view of the second preferred embodiment of a car door separating and attaching device in the present invention, showing it separating a door of a pick-up, a small car, etc.

FIG. 6 shows the second preferred embodiment of a car door separating and attaching machine is used to separate the swingable tailgate of a small car, only by adjusting the clamp hook rods 46, 46.

Figure 7:
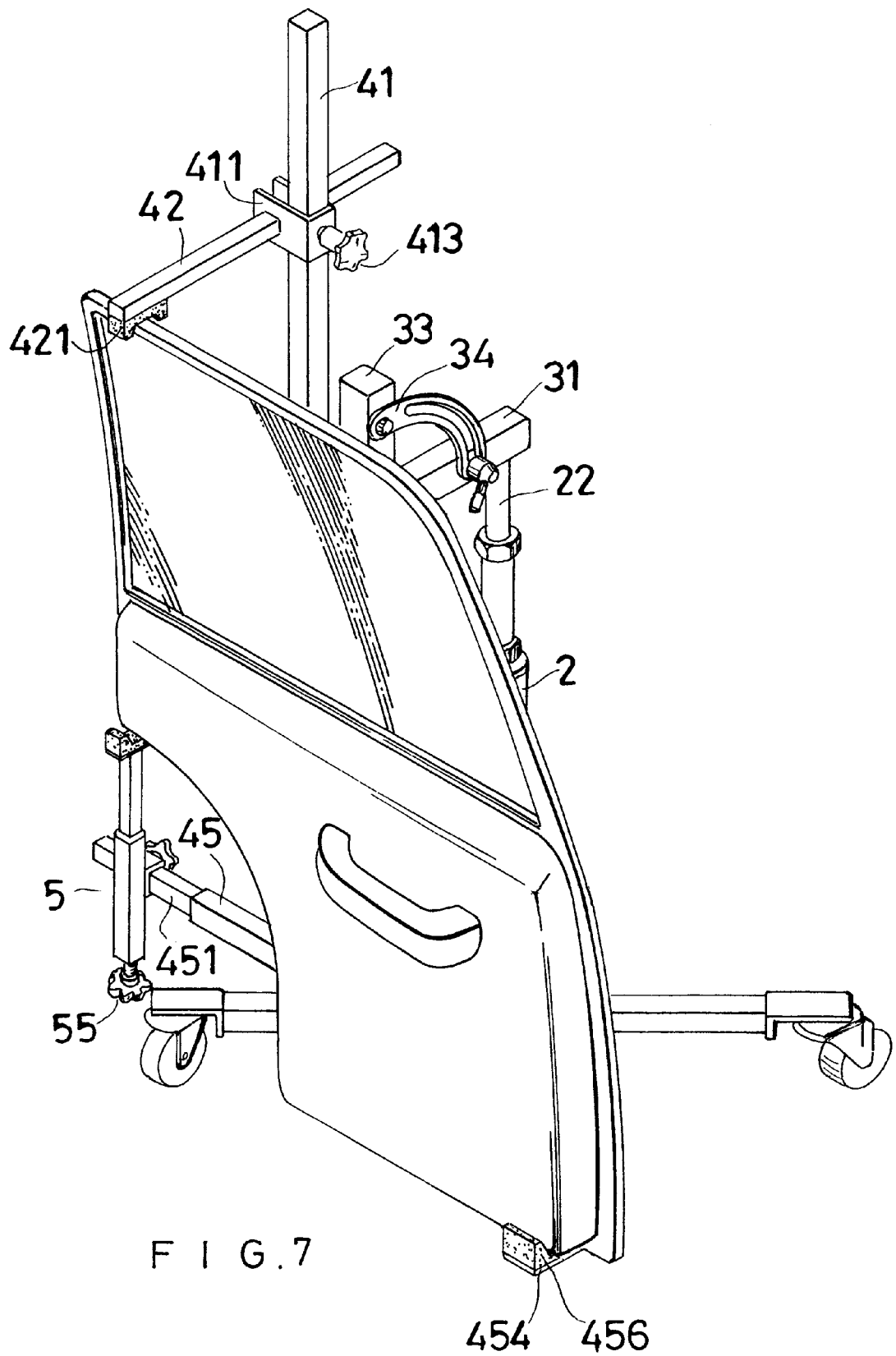

FIG. 7 shows the clamp frame 4 may be positioned upright instead of horizontal, with the clamp rod 42 combined movably on the sleeve 41. Then the auxiliary rods 451, 451 movably fitting in the lateral tube 45 have one end combined with the position plate 454, and the other end combined with the support rod 5. Then the car door separating and attaching device with this structure can also perform the same function as the first and the second embodiments.

As can be understood from the above description, this invention has the following advantages.

1. Clamping with this device enables only one worker to separate a door from or attach a door with a car, reducing labor and cost and increasing work efficiency.
2. A jack provided in this device helps to ensure stability in supporting clampingly a side door or a tailgate of a car, suitable for separating a large and heavy door of a car, reducing force of a worker.
3. The jack can be raised to an accurate position, permitting a worker perform supporting clampingly the door or the tailgate of a car of a station wagon for separating or attaching work.

While the preferred embodiments of the invention have been described above, it will be recognized and understood that various modifications may be made therein and the appended claims are intended to cover all such modifications which may fall within the spirit and scope of the invention.

What is claimed is:

1. A vehicle door separation and attaching device comprising:
   (a) a base (1);
   (b) a jack (2) having an output shaft (22) displaceable in a vertical direction;
   (c) an angle adjusting base (3) having a fixed base member (31) mounted to an upper end of said output shaft (22), said angle adjusting base (3) including a connecting rod (32) rotatably coupled to said fixed base member (31) and a curved guide member (34) having an arcuate guide slot (341), said curved guide member (34) coupled on opposing ends thereof to said fixed base member (31) and a vertically directed fixed arm member (33), said fixed arm member (33) being rotatably coupled to said fixed base member (31) and fixedly secured to said connecting rod (32); and,
   (d) a clamp frame (4) having a sleeve member (41) telescopingly coupled to an extension tube (44), said sleeve member (41) being fixedly secured to said connecting rod (32) and displaceable therewith, said clamp frame (4) including a pair of position base members (411, 412) slidably mounted on said sleeve member (41) and adapted to be adjustably coupled thereto, each of said position base members (411, 412) having a respective clamp rod member (42, 43) extending therefrom, each of said clamp rod members (42, 43) having a respective cushion member (421, 431) fixedly secured to one end of each of said clamp rod members (42, 43), said clamp frame member (4) further including a lateral tube member (45) fixedly secured to one end of said extension tube (44) and telescopingly coupled to a pair of auxiliary rod members (451), and a pair of L-shaped position plates (456) releasably secured to a respective one of said auxiliary rod members (451) for adjustably fixing a displacement distance between said L-shaped position plates (456) whereby said clamp frame (4) is reversibly vertically displaceable by said jack (2) and rotatably displaceable about an axis perpendicular to said vertical direction and said clamp rods (42, 43) and said L-shaped position plates (456) may be linearly and adjustably displaced along said sleeve member (41) and said auxiliary rods (451) respectively.

2. The vehicle door separation and attaching device as recited in claim 1 where at least one of said cushion members (421, 431) includes a V-shaped notch (432) formed therein for securing a glass window of said vehicle therein.

3. The vehicle door separation and attaching device as recited in claim 1 including a clamp hook rod (46) mounted on said sleeve member (41), said clamp hook rod (46) having a hook member (461) for hooking to a latch member of a vehicle tailgate.

4. The vehicle door separation and attaching device as recited in claim 1 including a tailgate support rod (5) mounted on said auxiliary rod (451) for supporting a tailgate of a vehicle.

5. The vehicle door separation and attaching device as recited in claim 4 where said tailgate support rod (5) has a support rod cushion member fixed to an end thereof for protection of said tailgate of said vehicle.

6. The vehicle door separation and attaching device as recited in claim 1, where said base (1) is rollingly displaceable on a base surface.

7. The vehicle door separation and attaching device as recited in claim 6 where said base (1) includes a plurality of wheel members (11) mounted thereto for rolling engagement with said base surface.

\* \* \* \* \*